E. GOFFERJE.
STEAM TRAP.
APPLICATION FILED MAR. 3, 1909.
935,753.
Patented Oct. 5, 1909.
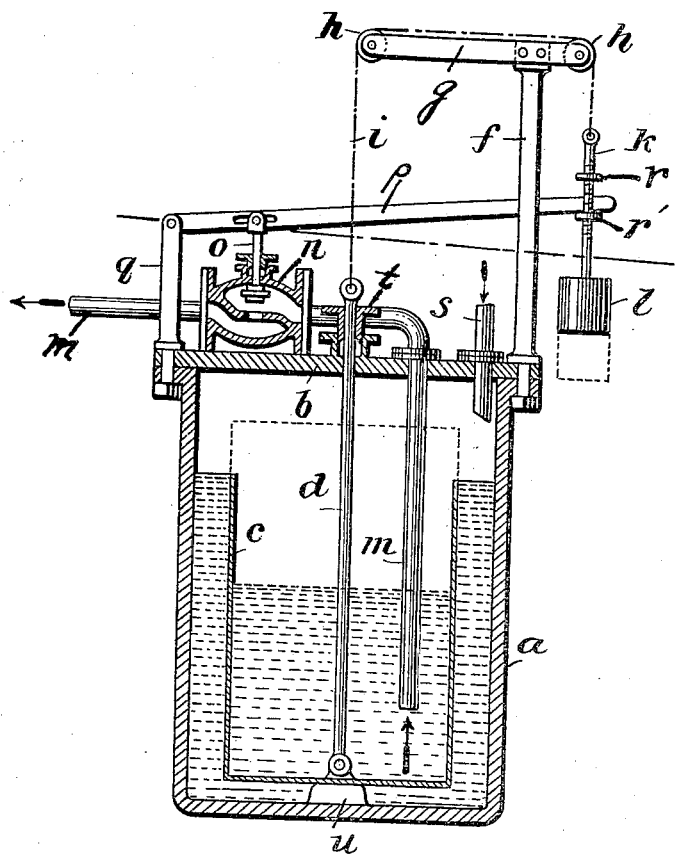
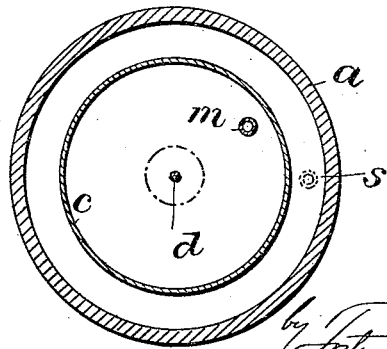
Witnesses
J. G. Hinkel
L. Hoskinson
Inventor
Emil Gofferje
by Foster Freeman Watson & Co't
Attorneys

UNITED STATES PATENT OFFICE.

EMIL GOFFERJE, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

STEAM-TRAP.

935,753.   Specification of Letters Patent.   Patented Oct. 5, 1909.

Application filed March 3, 1909. Serial No. 481,199.

*To all whom it may concern:*

Be it known that I, EMIL GOFFERJE, citizen of the German Empire, residing at Leverkusen, near Cologne, Germany, have invented new and useful Improvements in Steam-Traps, of which the following is a specification.

The present invention relates to improvements in steam traps of that character which are adapted to collect and automatically discharge water of condensation that accumulates in a steam heating or similar system.

In the accompanying drawings; Figure 1 is a vertical sectional view through a steam trap constructed in accordance with the present invention; Fig. 2 is a horizontal sectional view on the line 2—2 of Fig. 1.

Referring to the drawings $a$ designates the body of the trap which may be of cast metal and of any desired size and configuration. This body or receptacle $a$ is provided with a removable top or cover $b$ secured to laterally projecting ears or flanges on the body by bolts or similar fastening means.

The top $b$ supports two pipes $s$, $m$ which extend into the body $a$, the former being connected by suitable means not shown, with the system of pipes which is to be drained by the trap and the other pipe $m$ serving to discharge the water collected in the trap in the manner hereinafter described.

Mounted on the top $b$ is a valve casing $n$ which is arranged between two sections of the discharge pipe $m$ so that the valve therein will control the passage of water from the trap. The stem $o$ of this valve is attached to a lever $p$ which is fulcrumed at one end upon a standard $q$ rising from the top $b$ and is of such length that its other end projects beyond the opposite side of the trap body.

Within the body $a$ is arranged a bucket or open-top float $c$ which is of less diameter than the interior of the body to provide an annular water space between itself and the wall of the body. A rod $d$ connected at its lower end with the bottom of the float, extends upwardly through a suitable stuffing box $t$ on the removable top or cover $b$, and is connected at its upper end with one end of a cord or chain $i$. The said cord or chain extends around suitable guide wheels or rollers $h$, supported by a cross piece $g$ on an upright $f$ and has its opposite end connected with a weight or counterbalance $l$. The lever $p$ extends between suitable stops or tappets $r$, $r'$ on the stem $k$ of the weight $l$, which is threaded, to permit said tappets to be adjusted thereon, and connected with the flexible connector $i$, which tappets are adapted to engage and actuate the lever as the weight $l$ rises and falls in accordance with movements of the float $c$.

The inlet pipe $s$ extends into the trap in position to discharge water passing therethrough into the space between the float and wall of the trap body, while the discharge pipe $m$ extends into the bucket-like float $c$ to a point relatively near the bottom thereof when said float is in its elevated position.

The operation of the parts hereinbefore described will be readily understood. Normally the weight or counterbalance $l$ will operate to hold the bucket $c$ in the elevated position indicated by dotted lines and the tappet $r'$ will be in contact with the lever $p$, thus maintaining the valve closed. As the space between the bucket and casing $a$ is filled with water, the latter will overflow the upper edge of the bucket and when a sufficient quantity has been collected in said bucket to overcome the counterbalance $l$, the bucket will descend into the position shown in full lines, where it may rest upon a suitable cushion or block $u$. By such downward movement of the bucket $c$, the weight $l$ will be elevated and the tappet $r$ caused to shift the lever $p$ into the position shown, thus opening the valve and allowing the water contained in the trap to escape through the pipe $m$.

When the water contained in the bucket $c$ has been discharged to such an extent that the counterbalance $l$ again becomes effective, the parts will be restored to their previous positions, closing the valve.

It will be observed that the apparatus comprises a relatively small number of parts and that all of those liable to need attention or repairs, such as the valve, stuffing box $t$ and parts connected with the lever $p$, are located outside of the trap and thus are not only readily accessible, but are not exposed to the action of water or steam within the trap. By this construction also, it is possible to employ a valve having a maximum opening so that the contents of the trap may be rapidly discharged.

Having thus described the invention, what is claimed is:

1. In a steam trap, the combination with a suitable receptacle, having a removable top or cover, of pipes supported by the top for admitting water of condensation to said vessel and conveying such water therefrom, a lever fulcrumed on a support rising from the top, a valve casing mounted on the exterior surface of the top and connected with the discharge pipe, a valve therein having its stem connected with said lever, a bucket-like float within the body of the trap and into which the end of the discharge pipe therein extends, a lifting rod connected with the float and extending through the top of the trap, and connections between said rod and lever.

2. In a steam trap, the combination with a suitable receptacle, having a removable top or cover, and pipes for admitting water of condensation to said vessel and conveying such water therefrom, of a valve casing supported exteriorly of the trap and connected with the discharge pipe, a lever fulcrumed at one end on a support on the trap, a valve within said casing having its stem attached to the lever, a bucket-like float within the trap and surrounding the end of the discharge pipe therein, a lifting rod connected with the float and extending through the top of the trap, a standard rising from the trap and supporting suitable guide wheels or pulleys, a weight, a flexible connector extending from the weight to the lifting rod and passing over said guide wheels, and stops carried by said connector and projecting across opposite edges of the valve actuating lever adjacent its free end.

3. In a steam trap, the combination with a suitable receptacle, having a removable top or cover, of pipes supported by the top and adapted to admit water of condensation to said vessel and convey such water therefrom, a valve casing mounted on the top and having therein a valve controlling the passage of water through the discharge pipe, a lever fulcrumed at one end on a standard rising from the top and extending across said valve casing, the stem of the valve in said casing being connected at its upper end with said lever, a float within the body of the trap, a lifting rod having its lower end connected to said float and its upper end extending through a stuffing-box on the removable top, a weight or counterbalance, a flexible connector having one end attached to said weight and its other end attached to said lifting rod, guide wheels or rollers for the connector supported by a standard rising from the top of the trap, and tappets connected with said flexible connector and extending across the upper and lower edges of said lever, substantially as and for the purpose described.

In testimony whereof I have hereunto set my hand in the presence of two subscribing witnesses.

EMIL GOFFERJE. [L. S.]

Witnesses:
OTTO KÖNIG,
WILLY KLEIN.